US006430689B1

(12) United States Patent
Lacombe et al.

(10) Patent No.: US 6,430,689 B1

(45) Date of Patent: Aug. 6, 2002

(54) SYSTEM FOR SECURELY TRANSPORTING OBJECTS IN A TAMPER-PROOF CONTAINER, WHEREIN AT LEAST ONE RECIPIENT STATION IS MOBILE AND PORTABLE

(75) Inventors: Jean-Marc Lacombe, Daix; Marc Geoffroy, Saint Julien, both of (FR)

(73) Assignee: Axytrans SA, Paris (FR)

( * ) Notice: Subject to any disclaimer, the term of this patent is extended or adjusted under 35 U.S.C. 154(b) by 0 days.

(21) Appl. No.: 09/214,608

(22) PCT Filed: Jul. 10, 1997

(86) PCT No.: PCT/FR97/01254

§ 371 (c)(1),
(2), (4) Date: Jan. 8, 1999

(87) PCT Pub. No.: WO98/01833

PCT Pub. Date: Jan. 15, 1998

(30) Foreign Application Priority Data

Jul. 10, 1996 (FR) .......................................... 96 08605

(51) Int. Cl.$^{7}$ .................................................. H04L 9/00

(52) U.S. Cl. ........................ 713/168; 713/182; 70/277; 70/433; 70/434

(58) Field of Search ................................ 713/168, 182; 70/277, 433, 434

(56) References Cited

U.S. PATENT DOCUMENTS 4,236,463 A * 12/1980 Westcott ...................... 109/33
4,929,880 A * 5/1990 Henderson et al. ........... 320/20
5,191,611 A * 3/1993 Lang
5,315,656 A * 5/1994 Devaux et al.

FOREIGN PATENT DOCUMENTS

| | | | | |
|---|---|---|---|---|
| EP | 0 307 375 | | 3/1989 | |
| EP | 0 409 725 | | 1/1991 | |
| EP | 0 546 701 | | 6/1993 | |
| GB | WO 9202903 | * | 2/1992 | ................. 713/168 |
| WO | WO 92/02903 | | 2/1992 | |
| WO | WO 93/12510 | | 6/1993 | |

OTHER PUBLICATIONS

Girardot, Bull CPB Smart Cart Uses in Cryptology, Eurocrypt 84, 1984.*

* cited by examiner

*Primary Examiner*—Gail Hayes
*Assistant Examiner*—James Seal
(74) *Attorney, Agent, or Firm*—Young & Thompson

(57) ABSTRACT

A system for securely transporting valuables enclosed in a container which responds to attempted tampering by damaging said valuables and is provided with internal control means operating as a limited-mode machine that may include at least some of the elements of a series consisting of a user such as a dispatcher, a recipient or an escort, a container, and a single remote host capable of communicating with the internal control means of said container, at least at the time of departure. The elements are interconnected via a single terminal to form a star network of stations with said station at the center. The system is characterized in that the station of at least one recipient is not a resident station but a mobile and portable station.

13 Claims, 2 Drawing Sheets

(PRIOR ART)

SYSTEM FOR SECURELY TRANSPORTING OBJECTS IN A TAMPER-PROOF CONTAINER, WHEREIN AT LEAST ONE RECIPIENT STATION IS MOBILE AND PORTABLE

BACKGROUND OF THE INVENTION

1. Field of the Invention

This invention relates to a system for the protection of valuable documents or objects such as means of payment, bank notes, cheques or bank cards, enclosed in a physically burglar-proof container, called a container throughout the rest of this description, passing through a sequence of a restricted number of identified logical states, and which will destroy the contents by appropriate means in the case of an aggression.

2. Description of the Related Art

A protection system of this type is described in detail in European patent EP-0.409.725, and it is characterized in that the container is provided with internal management means operating like a machine with "limited modes" in which the operating cycle comprises a restricted number of logical states called "modes", the transition from a first mode to a second mode being the consequence of an isolated event, and the acceptability of this event being, or having previously been, checked by independent means that can be put into contact with the said internal management means of the container, the said transition then being accompanied by loss of memory of the previous mode.

According to the previous patent, the system can be used for protection of cash placed in a container, for example by the manager of a bank agency called the sender to be transported by a transporter, for example to a branch of this bank agency; the sequence of logical states, and consequently the transfer of responsibility, is controlled by a single computer that consequently acts as supervisor to manage the logical security of the containers, in other words to verify the acceptability of transitions from some operating modes of their internal management means, to other modes; in this respect, it is worth mentioning three particularly significant examples of transitions:

a) the only way to protect the cash during transport is by the container: in this case the system then consists of the container alone, b) at the time of delivery after transport, the only way of interrupting the mode in which the container was placed at the beginning of the transport operation, and which is all that it remembers, is a source of the information external to the container; the system must then be extended to include the external source of information, in other words the computer, which the container must firstly recognize as a reliable and safe partner, c) after delivery, protection of the cash contained in the container is still complete, since it cannot be opened until the system is extended to include a second external information source, namely the user of this cash (in other words the addressee, the sender or the transporter) who must in turn be recognized as a reliable and safe partner by the container and the supervising computer.

Transitions between these three types of mode control the transfer of responsibility attached to the protection of the cash, regardless of whether or not the cash is enclosed in the container.

According to one fundamental characteristic of the previous document, the container, the computer, the sender or the addressee and the transporter are linked at the departure and arrival to a single terminal called a "station" which forms the departure point and arrival point of a star network, in which the said station is the center. Therefore, there is a first station at the departure location of the container, and at least one other station at its arrival location. The use of this type of station connecting all parties concerned in a star configuration, helps to significantly simplify interfaces necessary for the said parties to dialog with each other. Consequently, the stations comprise the sophisticated electronic interfaces and containers and users simply manage an elementary connection dialog with these stations; obviously, the supervising computer itself manages more complex exchanges and actually forms a server center remote from all stations, all users and all containers, which provides it with efficient protection against logical and physical aggression.

Finally, in addition to the structural confidentially of stations, all communications between two parties and the system make use of a protocol in which the party who receives a message can authenticate the party who is supposed to have sent the message, and an acknowledgement of reception can also be made for this authentication.

This type of protection system is particularly useful for all cash transfers made as part of a routine and especially with a repetitive nature, for example such as transfers between a bank and its various agencies; it is then quite appropriate to install permanent terminals at the arrival and at the departure points, these permanent terminals being called "residue stations" in the prior document mentioned above, which act as interfaces between the container(s) physically used for the transfer of cash, the person (in other words the sender, transporter and later the addressee) and the server center, also called the supervising computer.

However many circumstances arise in which it is necessary to occasionally or temporarily transfer or collect cash from or to locations that may vary considerably in different periods; particularly to provide a service for the safe transfer of cash, or for any category of small business for which the service frequency is inherently very variable.

SUMMARY OF THE INVENTION

It is easily understandable that in all these cases, it is not economically viable to install sophisticated resident equipment, and this is why this invention proposes that resident stations would be replaced by portable or mobile stations at the destination point; it is then quite conceivable that this type of solution could be very flexible in use for the transporter, to the extent that it does not require any prior installation of equipment and the customer can enjoy very short service start up times, which gives the transporter a decisive commercial advantage; this is the case particularly for events such as trade fairs, markets, exhibitions, or to be able to pick up or deliver cash from or to shops. Note also that even when transporting cash between banks, many cases are only single deliveries in which cash is transferred immediately and for which no secure storage is required; a mobile station is also quite suitable for this type of service, and conversely installation of a resident station would be inconceivable, making the protection system as described in the previous patent mentioned above unusable.

Consequently, this invention proposes a system for secure transport of securities and particularly means of payment, bank notes, checks or bank cards from a central departure site to a destination site, enclosed in a container which in case of aggression will cause their destruction by appropriate means, and which is provided with internal management means operating like a "machine with limited modes", in which the operating cycle comprises a restricted number of logical states called modes, the transition from a first mode to a second mode being the result of an isolated event, the acceptability of which being or having previously been checked by independent means capable of making contact with the said internal management means, the said transition then being accompanied by erasure of memory of the previous mode, the said system being constructed so that a user of the securities, who may be a sender, an addressee or a transporter, may utilize a container in connection with a single server center in a remote location capable of getting into contact with internal management means of the said container, at least when it is at the departure point, to check the acceptability of an event that causes a transition from one mode to another mode, the said elements being connected to each other through a single terminal called a station, in order to form a star network in which the said station is the center, characterized in that the station used by at least one addressee is a mobile and transportable station, and is not a resident station.

BRIEF DESCRIPTION OF THE DRAWINGS

Other characteristics and advantages of the system according to the invention will be more obvious from the following description of a particular embodiment involving a simple case of transporting cash between a central site and an addressee site, for example a small shop, this case being given as a non-restrictive illustration of the system according to the invention, with reference to the attached drawing in which.

DESCRIPTION OF THE PREFERRED EMBODIMENTS

Figure 1:
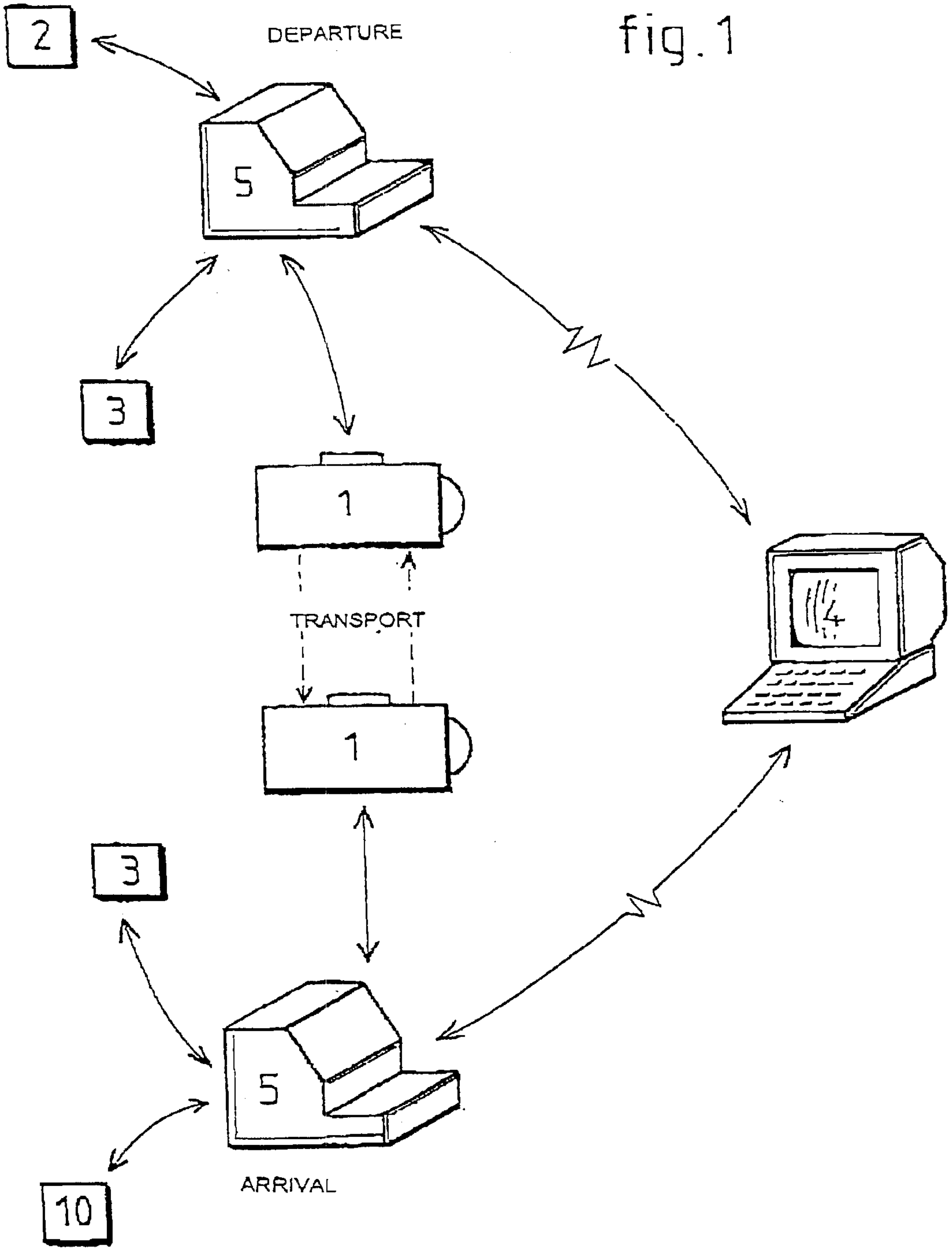
FIG. 1 is a block diagram of the network organization of the system according to prior art described in European patent EP-0.409.725.

With reference to FIG. 1, the system according to prior art is used particularly for the protection of cash which has been placed in a container 1, for example by the manager of a bank head office, called the sender 2 in the remainder of this document. In the example, the container 1 must be transported by a transporter 3 to an occasional addressee, for example a small shopkeeper.

All events preceding the transfer of cash and leading to a number of transitions from one mode to another in accordance with the information in prior art, are described in detail in patent EP-0.409.725, and we will simply add here that transfers of responsibility related to the various logical states possible for container 1 are controlled by a single supervising computer 4 managing the logical security of container 1, in other words checking the acceptability of transitions from some operating modes of the management means internal to the said computer to other operating modes. We will refer to the description given in prior art for details of possible transitions between various operating modes starting from the moment at which the cash is placed inside the container 1 unit its arrival at the destination site, where the addressee must take responsibility for the cash that he is expecting.

As in prior art, the general system according to the invention as shown in FIG. 1 is composed of a star network connecting the container 1, the supervising computer 4, the sender 2 and the transporter 3; this single terminal is called a station throughout the rest of this description, and forms the hub of the star network.

Figure 2:
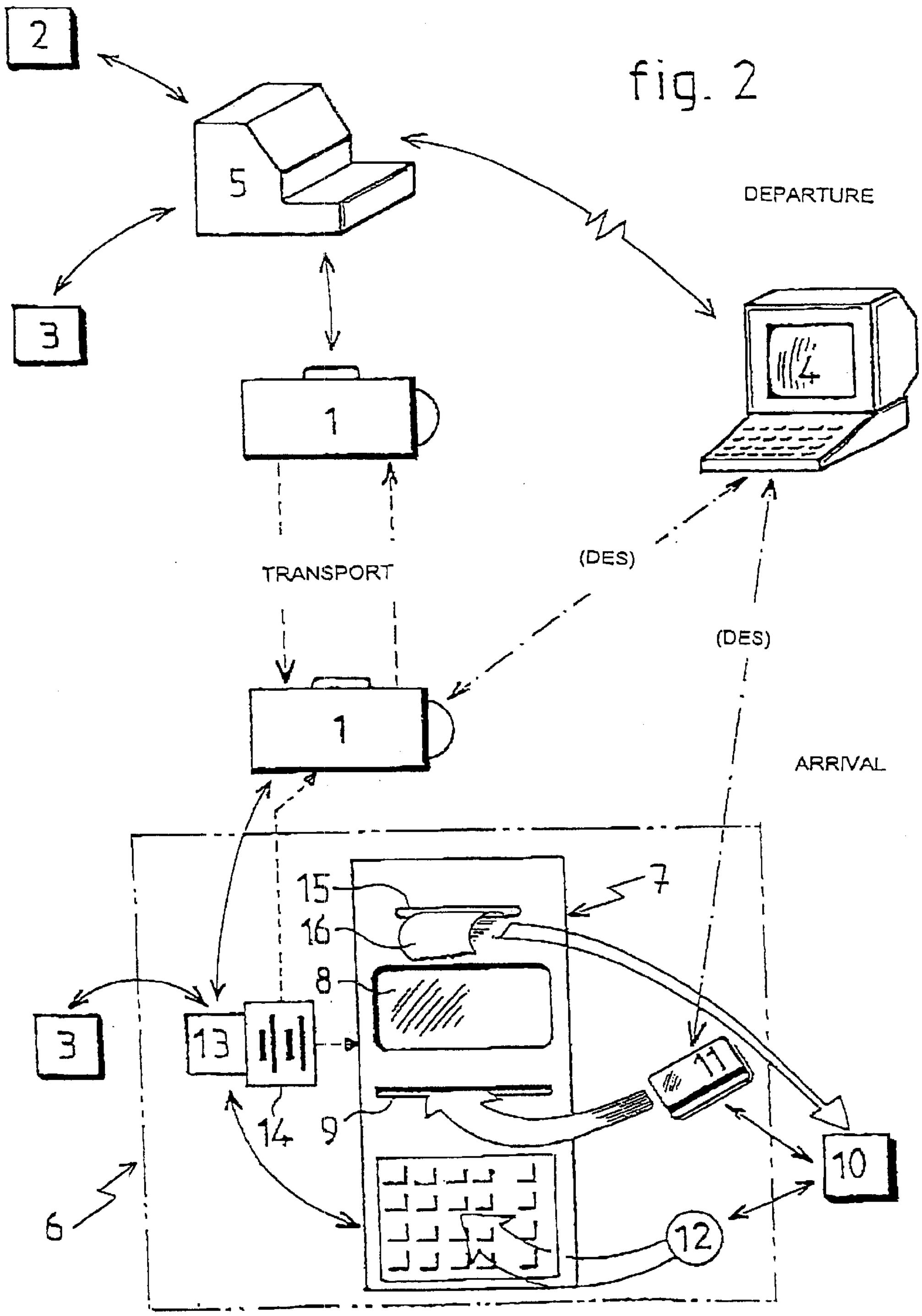
FIG. 2 is a block diagram of the organization of a mobile station according to this invention.

A first station 5 is naturally located at the departure location of the container 1 and, in accordance with the invention and with reference to FIG. 2, the arrival station is no longer resident, but on the contrary is mobile and transportable for all reasons described at length in the preamble to this description, namely that the transporter can deliver cash very occasionally to an addressee who may be located at any location without the need for the same transporter to have come earlier to install an arrival station containing sophisticated and consequently expensive equipment.

With reference to FIG. 2, the mobile station 6 comprises a terminal 7 with a keyboard and a screen 8, equipped with a microprocessor and a smart card reader 9 capable of receiving a personalized smart card 11 in the possession of the correct addressee 10, in particular the smart card being authenticated by a confidential code 12 given separately and earlier by the transporter to the addressee 10, under security conditions that will be described later.

The mobile station 6 according to an essential characteristic of the invention is completely disconnected from the supervising computer 4 during the transfer, in other words there is no means of communication between the supervising computer and the terminal at the time that the cash is handed over.

On the other hand, the mobile station 6 is made to communicate with the container 1 through a communication interface 13 which, according to a secondary and advantageous characteristic of the invention, comprises a power supply source 14 independent of the container 1 and its electromagnetic locking devices.

Before the envisaged cash transport, the final user 10 is issued with a smart card 11, which is very similar in its form and operation to a conventional bank card; this card 11 is first loaded with cryptographic data which will subsequently be necessary firstly for message exchanges between the parties concerned on the arrival site, but also for initialization and the smooth operation of all steps necessary to authorize opening of the container and consequently recovery of cash contained in it by the legitimate addressee 10, while correctly programming the return of the said container to the central departure site. Obviously, all encryption data are generated by the computer 4 before departure, in this case operating as a server center. In this way, computer 4 no longer has a direct role in the delivery steps; this is why exchanges between the computer, the station 6 through card 11 and container 1 at the destination, have been shown in FIG. 2 as thin chain dotted lines.

Note here that, like what was described in the prior patent, authentication of the part of the system that sends a message consequently consists of authenticating the said message itself by verification of a computer signature calculated on the contents of the said message by means of a key controlled algorithm, in which the keys are naturally only known to the parties exchanging the said message.

Consequently, the encryption algorithm used will advantageously be a symmetric type of algorithm, for example the DES (Data Encryption Standard) algorithm for which the characteristics are standardized; note that in this algorithm, the container 1/memory card 11 pair has a key K, this key K being stored in a memory of container 1 whereas the card 11 which has the same key K, obviously remains protected solely by the final user 11. Note that advantageously, the electronic signature designed to authenticate the message and its author will itself be calculated on the contents of messages making use of an algorithm that is beneficially similar to the DES encryption algorithm that has just been mentioned.

Encryption and authentication keys can also be differentiated to provide even better cryptographic security.

Finally, note that operation of container 1 is completely identical to operation of containers fully described in European patent EP-0.409.725 mentioned above, in other words container 1 in this case also operates like a "machine with limited modes".

In accordance with the simplified example given to illustrate the invention, it is therefore agreed to deliver cash from a central agency to an occasional user 10 not equipped with a resident station 5. Prior to the envisaged operation, the user 10 will have received firstly his duly encrypted smart card 11, and secondly, and separately, a secret code 12 corresponding to the card 11 in the same way as for bank cards.

At the same time, the supervising computer 4 generates one or several DES type encryption keys that it will input into container 1 at the time of departure of the cash transfer after firstly inputting them into the card microprocessor to enable authentication of the addressee when the cash in container 1 is delivered.

Similarly, before departure from the central agency, the container or containers 1 for which the mobile station 6 is to be used will be informed of this situation by an additional operation performed by the manager of the central agency; in the example, the container 1 will be programmed with its destination being a mobile station 6, and not a resident station 5.

When the container or containers 1 is (are) delivered, the transporter 3 presents the terminal 7 to the presumed user 10, who must then insert the encrypted smart card 11 that he holds and at the same time input his confidential code 12 on the keyboard of the said terminal 7. When the user has been correctly identified, the transporter 3 retrieves the terminal to connect it through the communication interface 13 to the container 1 which, after successful comparison of the authentication codes of the carrier and therefore of the addressee, immediately changes to open mode so that the authorized user 10 can recover the cash that was normally intended for him.

Container 1 is then closed again, reprogrammed and put in departure mode towards the original site, in accordance with the sequence of steps which are independent of the supervising computer 4 which cannot take any action at this time.

After the removal authorization, the transporter 3 disconnects container 1 from its interface 13, and the user 10 retrieves his smart card 11; the transporter 3 returns to the transport vehicle with the mobile terminal and container 1 to return to the departure site, in other words the central agency.

According to one particular characteristic of the invention, an independent printer 15 may be added to the terminal 7 in order to issue a ticket 16 to the addressee of the cash 10, forming a receipt for the cash.

Naturally, the microprocessor used on the terminal 7 will advantageously be used to store any information output from the containers, and concerning traceability of operations carried out daily to sites not equipped with fixed stations 5.

What is claimed is:

1. System for secure transport of materials from a central departure site to a destination site, comprising:

a container which in case of aggression will cause destruction of the materials, the container including an electromagnetic lock and being provided with internal management means operating as a machine with limited modes, in which the operating cycle comprises a restricted number of logical states called modes with changes between the modes being accomplished through transitions, one said transition from a first mode to a second mode being the result of an isolated event, validity of each of the transitions being checked by independent means capable of making contact with the internal management means, the transition then being accompanied by an erasure of memory of the previous mode, a single server center in a remote location capable of getting into contact with the internal management means of said container, at least when it is at the departure site, to check the validity of an event that causes a transition from one mode to another mode, a station arranged as a center of a star network, wherein the station is a mobile and transportable station comprising a terminal, the terminal comprising a keyboard, a screen, a microprocessor and a smart card reader, the mobile and transportable station being unconnected to the server center and constructed so that the mobile and transportable station can be connected through a communication interface with the container, the interface including an energy source to the power the terminal and the container.

2. Protection system according to claim 1, wherein events that may occur at a destination location at which there is a said mobile station, are programmed originally before departure from a central site, in management means internal to the container, transitions from one of the modes to another of the modes resulting from the events that may occur at the destination location then taking place without communication between the container and the server center.

3. Protection system according to claim 1, wherein an addressee associated with a said mobile station holds a smart card personalized with a confidential code previously and separately handed over to the said addressee enabling him to firstly identify himself by inserting the card in the reader validated by entering the confidential code, and secondly to chain open-reprogramming-departure events, when the container is delivered, making use of the container's communication interface coupled to the terminal.

4. Protection system according to claim 3, wherein the microprocessor of the container and the personalized card held by the addressee comprise computer means for authentication of messages exchanged between the microprocessor of the container and the personalized card, through the terminal and the interface.

5. Protection system according to claim 4, wherein authentication of the sending part of the message consists of authenticating the message itself by verifying a computer signature calculated on the contents of the said message by means of a key controlled algorithm (DES), the keys being known only by the parties to the exchange.

6. Protection system according to claim 1, wherein messages exchanged between parties in the system are encrypted by means of a key controlled encryption algorithm (DES), the keys being known only by the parties, the said algorithm (DES) being a variant of the algorithm used to create an authentication signature for the said message.

7. Protection system according to claim 1, wherein the terminal is equipped with an independent printer constructed to provide an addressee with a receipt.

8. Protection system according to claim 1, wherein the terminal records all information originating from the container of containers concerning traceability of events that occurred daily, to sites equipped with the mobile stations.

9. A system for secure transport of materials, comprising:

a container comprising:

an electromagnetic lock; and internal management means capable of operating in a predetermined number of modes, a transition from a first to a second mode being checked by independent means capable of making contact with the internal management means, said transition causing a loss of memory of the first mode;

at least one resident station adapted to communicate with the internal management means of the container;

a supervising computer adapted to exchange data with the at least one resident station;

a programmable smart card;

at least one mobile station located at a destination location comprising a terminal with a keyboard and screen, a microprocessor, a smart card reader, and a communication interface allowing communication with the container, the at least one mobile station being free of a communication connection with the supervising computer;

wherein in operation of the system the supervising computer sends data to the smart card and corresponding data to the internal management means of the container through the at least one resident station as the container is secured by the electromagnetic lock, the locked container then being transportable to said mobile station to be connected to the mobile station through the communication interface, so that the electromagnetic lock is released only upon entry of a predetermined code through the keyboard in conjunction with passing the smart card through the smart card reader.

10. The system of claim 1, wherein the energy source of the interface is also adapted to power the electromagnetic lock.

11. A system for secure transport of materials comprising:

a container comprising:

an electromagnetic lock; and an internal management element operating as a state machine for which there are a restricted number of logical modes between which the internal management element can transition, validity of each said transition between a previous said mode and a current said mode being verifiable by an independent means capable of making contact with the internal management element, each said transition resulting in erasure of memory related to the previous mode;

a server center in a remote location capable of making contact with the internal management element of the container, the serve center being structured and arranged to be able to check the validity of transitions of the internal management element of the container; and a mobile and transportable station comprising:

a terminal comprising:

a keyboard;

a screen;

a microprocessor; and a smart card reader;

wherein the mobile and transportable station is unconnected to the server center and constructed so that the mobile and transportable station can be connected through a communication interface with the container, the interface including an energy source to power the station and the container.

12. The system of claim 11, wherein the container is constructed to detect an intrusion attempt and destroy the materials in the container if said intrusion is detected.

13. The system of claim 11, wherein the mobile and transportable station is constructed so that it will actuate the electromagnetic lock of the container if first data read from a smart card through the smart card reader and second data entered through the keyboard are identified by the microprocessor as properly corresponding to one another.

* * * * *